United States Patent
Santos et al.

(10) Patent No.: US 6,573,710 B1
(45) Date of Patent: Jun. 3, 2003

(54) POSITION AND/OR DISPLACEMENT SENSOR INCLUDING A PLURALITY OF ALIGNED SENSOR ELEMENTS

(75) Inventors: A. John Santos, Farmington, CT (US); Mark E. LaCroix, New Hartford, CT (US); Pascal Desbiolles, Thorens Glieres (FR)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 09/549,005

(22) Filed: Apr. 14, 2000

(30) Foreign Application Priority Data

Apr. 14, 1999 (FR) .............................................. 99-04657

(51) Int. Cl.[7] .......................... G01P 3/44; G01P 3/487; G01P 13/00; G01B 7/30
(52) U.S. Cl. .................. 324/207.25; 324/165; 324/174; 324/207.12; 324/207.2
(58) Field of Search .................. 324/207.12, 207.2, 324/207.21, 207.24, 207.25, 165, 166, 173, 174; 384/448

(56) References Cited

U.S. PATENT DOCUMENTS

| | | | | |
|---|---|---|---|---|
| 4,468,618 A | * | 8/1984 | Zander ........................ | 324/165 |
| 4,594,548 A | * | 6/1986 | Takahashi et al. ..... | 324/207.21 |
| 4,732,494 A | | 3/1988 | Guers et al. ................. | 384/448 |
| 4,946,295 A | | 8/1990 | Hajzler ........................ | 384/448 |
| 4,968,156 A | | 11/1990 | Hajzler ........................ | 384/448 |
| 5,017,868 A | | 5/1991 | Hajzler .................. | 324/207.22 |
| 5,036,276 A | * | 7/1991 | Aizawa ................. | 324/207.21 |
| 5,130,650 A | | 7/1992 | Lemarquand .......... | 324/207.22 |
| 5,198,762 A | * | 3/1993 | Shimoe et al. ......... | 324/207.21 |
| 5,310,266 A | | 5/1994 | Coux et al. .................. | 384/448 |
| 5,431,413 A | | 7/1995 | Hajzler ........................... | 277/2 |
| 5,451,869 A | | 9/1995 | Alff .............................. | 324/173 |
| 5,523,681 A | | 6/1996 | Hajzler et al. ............... | 324/174 |
| 5,570,013 A | | 10/1996 | Polinsky et al. ............. | 324/174 |
| 5,594,334 A | | 1/1997 | Sonnerat et al. ............. | 324/173 |
| 5,611,545 A | | 3/1997 | Nicot ............................. | 277/2 |
| 5,619,132 A | * | 4/1997 | Spies ..................... | 324/207.21 |
| 5,640,087 A | | 6/1997 | Alff ............................. | 324/173 |
| 5,680,042 A | | 10/1997 | Griffen et al. ......... | 324/207.21 |
| 5,803,419 A | | 9/1998 | Nicot ...................... | 248/224.7 |
| 6,246,233 B1 | * | 6/2001 | Griffen et al. ......... | 324/207.21 |

FOREIGN PATENT DOCUMENTS

| | | | |
|---|---|---|---|
| EP | 0242492 | 10/1987 | ............ G01D/5/16 |
| EP | 0 375 019 | 6/1990 | |
| EP | 0 395 783 | 11/1990 | |
| EP | 0 376 771 | 2/1992 | |
| EP | 0 534 055 | 3/1993 | |
| EP | 0 420 040 | 7/1993 | |
| EP | 0 420 041 | 7/1993 | |
| EP | 0 557 931 | 9/1993 | |
| EP | 0 557 932 | 9/1993 | |
| EP | 0 522 933 | 3/1994 | |
| EP | 0 590 222 | 4/1994 | |
| EP | 0 438 624 | 5/1994 | |
| EP | 0 484 195 | 8/1994 | |
| EP | 0 518 157 | 12/1994 | |
| EP | 0 498 298 | 3/1995 | |
| EP | 0 511 459 | 7/1995 | |
| EP | 0 487 405 | 8/1995 | |
| EP | 0 488 853 | 8/1995 | |
| EP | 0 521 789 | 12/1995 | |

(List continued on next page.)

Primary Examiner—Gerard R. Strecker
(74) Attorney, Agent, or Firm—Michael Best & Friedrich LLP

(57) ABSTRACT

A sensor of position and/or of displacement of a moving member generating magnetic pulses. The sensor comprises a plurality of aligned sensitive elements that are divided into at least two subassemblies. The signals emanating from the subassemblies are processed by an electronic circuit able to deliver two analog signals in substantially perfect quadrature.

8 Claims, 2 Drawing Sheets

FOREIGN PATENT DOCUMENTS

| | | | |
|---|---|---|---|
| EP | 0 745 857 | 12/1996 | |
| EP | 0 751 311 | 1/1997 | |
| EP | 0 531 924 | 3/1997 | |
| EP | 0 767 385 | 4/1997 | |
| EP | 0 591 113 | 7/1997 | |
| EP | 0784199 | 7/1997 | ............ G01D/5/16 |
| EP | 0 647 851 | 7/1998 | |
| EP | 0 701 133 | 6/1999 | |
| EP | 0 701 132 | 11/1999 | |
| EP | 0 753 679 | 3/2000 | |
| EP | 0 693 689 | 10/2001 | |
| EP | 0 714 029 | 12/2001 | |
| WO | WO92/09138 | 5/1992 | |
| WO | WO93/22623 | 11/1993 | |
| WO | WO94/05974 | 3/1994 | |
| WO | WO94/05975 | 3/1994 | |
| WO | WO98/48284 A3 | 10/1998 | |
| WO | WO98/48284 A2 | 10/1998 | |

\* cited by examiner

POSITION AND/OR DISPLACEMENT SENSOR INCLUDING A PLURALITY OF ALIGNED SENSOR ELEMENTS

BACKGROUND OF THE INVENTION

This invention relates generally to magnetic sensors of speed, direction, rotation and/or position of a member moving with respect to the sensor and, more particularly, to such sensors that are employed in instrumented bearings or bushes.

Numerous designs of bearing with built-in magnetic encoder and sensors of Hall-effect probe or magnetoresistor type are already known in the prior art.

Reference may be made for example to the following documents:

French patent applications 2 667 947, 2 669 432, 2 669 728, 2 671 633, 2 678 691, 2 678 692, 2 690 989, 2 693 272, 2 694 082, 2 702 567, 2 710 985, 2 718 499;

European patent applications 375 019, 420 040, 420 041, 438 624, 487 405, 488 853, 498 298, 518 157, 521 789, 522 933, 531 924, 557 931, 557 932, 647 851, 693 689, 701 132, 701 133, 714 029, 745 857, 751 311, 753 679, 767 385.

Reference may be made, likewise by way of example, to the following documents emanating from the applicant:

French patent applications 2 639 689, 2 640 706, 2 645 924, 2 730 283, 2 732 458, 2 717 266, 2 701 298;

European patent applications 371 835, 376 711, 394 083, 484 195, 607 719, 612 219, 619 438, 631 140, 652 438, 671 628, 725 281, 735 348.

When one wishes to ascertain both the speed of rotation of the inner race or of the outer race of the bearing and also the direction of rotation of this race, it is known practice to utilize two signals electrically out of phase by 90° to define the direction of rotation.

Reference may be made, for example, to the documents FR-A-2 599 794, FR-A-2 660 028 and EP-A-395 783.

Other similar devices are known in the prior art for determining the angle of rotation and/or the direction of rotation of a given member with respect to several circumferentially spaced sensors.

The document WO-A-98 48 284 describes a method for detecting the direction of rotation of a wheel by means of Hall probes disposed in series in the circumferential direction of the wheel.

The document FR-A-2 750 493 describes a steering wheel angular displacement sensor comprising at least three Hall-effect cells offset by around 120° with respect to one another.

The document EP-A-534 055 describes a rotation signaling system comprising two Hall-effect elements, a permanent magnet being arranged in such a way as to maintain a 90° phase shift between the signals emanating from the two sensors.

Reference may likewise be made to the documents EP-A-511 459 and WO-A-92 09 138.

Also known are devices able to detect the displacement of a magnetic field source and comprising several Hall probes disposed in several assemblies placed on a predetermined locus, optionally rectilinear.

The documents WO-A-94 05 974 and WO-A-94 05 975 describe devices comprising Hall-effect elements disposed a predetermined distance apart over a predetermined locus.

The document EP-A-590 222 describes a magnetic position sensor able to detect the position of a magnetic element having a field component which vanishes at at least one point in space, this sensor comprising an array of Hall probes aligned in a direction perpendicular to said field component and to the current flowing through the probes.

Reference may likewise be made to the document EP-A-591 113.

The document WO-A-93 22 623 describes an apparatus generating a cumulative signal representing the position of a magnet with respect to a linear series of Hall-effect switches.

The known devices of the prior art for the magnetic detection, with the aid of Hall-effect probes or the like, of the speed, of the direction of rotation and/or of the position of a member moving with respect to said probe exhibit considerable bulk, are not modular and are therefore difficult to transpose from a given application to another application.

The invention relates to a sensor of position, of direction of rotation and/or of speed of a moving member, via the Hall effect or magnetoresistance, which does not have the drawbacks of the sensors known from the prior art.

SUMMARY OF THE INVENTION

To this end, and according to a first aspect, the subject of the invention is a sensor of position and/or of displacement of a moving member generating magnetic pulses, said sensor comprising a plurality of aligned sensitive elements, characterized in that the sensitive elements are divided into at least two subassemblies, the signals emanating from these subassemblies being processed by an electronic circuit able to deliver two analog signals in substantially perfect quadrature.

The sensitive elements are, for example, chosen from among the groups comprising Hall-effect probes, magnetoresistors, giant magnetoresistors and are placed equidistantly from one another.

According to a second aspect, the subject of the invention is a method of processing signals emanating from a sensor as presented hereinabove which comprises the following steps:

creation of at least two subassemblies of N sensitive elements;

summation of the signals emanating from each sensitive element of the first subassembly so as to form a first sum $S_1$;

summation of the signals emanating from each sensitive element of the second subassembly so as to form a second sum $S_2$;

addition of the two sums $S_1$ and $S_2$;

addition of the signals $S_1$ and $-S_2$.

As a variant, the even number of sensitive elements which is chosen for the creation of the subassemblies of sensitive elements is performed by programming of EEPROM, ZENER ZAPPING type, or the like.

The method can furthermore comprise amplification of the signals $S_1+S_2$ and/or $S_1-S_2$ so as to obtain an identical amplitude for these two signals.

According to a third aspect, a number of sensitive elements which is a multiple of four is employed to form four subassemblies of P sensitive elements, the method comprising the steps of:

summation of the signals emanating from each sensitive element of the first subassembly, so as to form a signal $S_1$;

summation of the signals emanating from each sensitive element of the second subassembly, so as to form a signal $S_2$;

summation of the signals emanating from the third subassembly, so as to form a signal $S'_1$;

summation of the signals emanating from each sensitive element of the fourth subassembly, so as to form a signal $S'_2$;

formulation of the signals $S_1-S_2-(S'_1-S'_2)$ and $S_1+S_2-(S'_1+S'_2)$ devoid of magnetic offset.

The method can also comprise a step of interpolation increasing the resolution of the signals emanating from the sensors.

According to a fourth aspect, the subject of the invention is a device for implementing the method as presented hereinabove, comprising an ASIC type customized integrated circuit.

According to a fifth aspect, the subject of the invention is a position and/or displacement sensor assembly as presented above, associated with a device described hereinabove, in which the sensitive elements of the sensor are incorporated within the ASIC customized integrated circuit.

According to a sixth aspect, the subject of the invention is the application of the assembly presented hereinabove to the detection of the direction of rotation of a member generating magnetic pulses, which member is of annular shape and is formed by a plurality of continuous domains having reversed direction of magnetization of a given domain with respect to the two domains which are contiguous with it.

Other subjects and advantages of the invention will become apparent in the course of the following description of an embodiment, which description will be given with reference to the appended drawings.

BRIEF DESCRIPTION OF THE DRAWING FIGURES

FIGS. 1A–1C represent an embodiment of the detection device according to the invention; wherein FIG. 1A shows the detected magnetic field strength β over time; FIG. 1B is a figurative illustration of the embodiment of the detection device; and FIG. 1C is a graphical representation of the computed values over time;

FIGS. 2A–2C represent a second embodiment of the detection device according to the invention; wherein FIG. 2A shows the detected magnetic field strength β over time; FIG. 2B is a partial figurative illustration of the second embodiment of the detection device; and FIG. 2C is a graphical representation of the computed values over time.

Figure 2A:
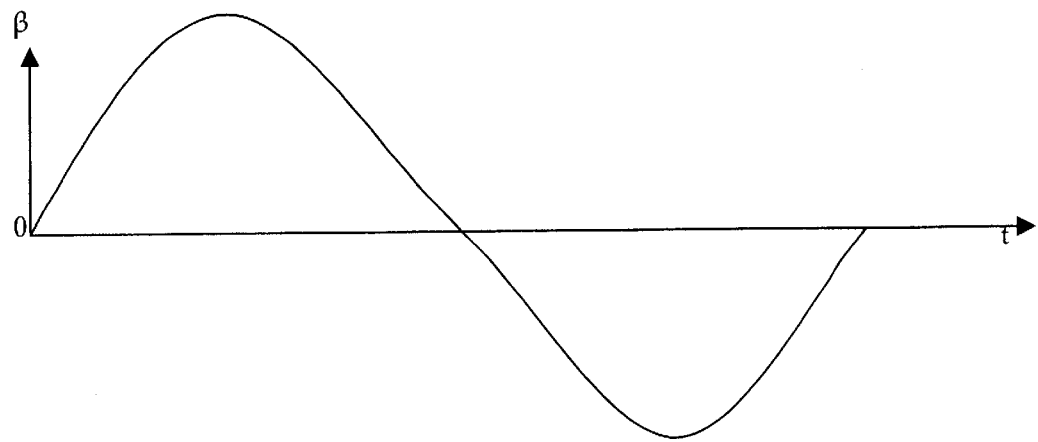
Figure 2B:
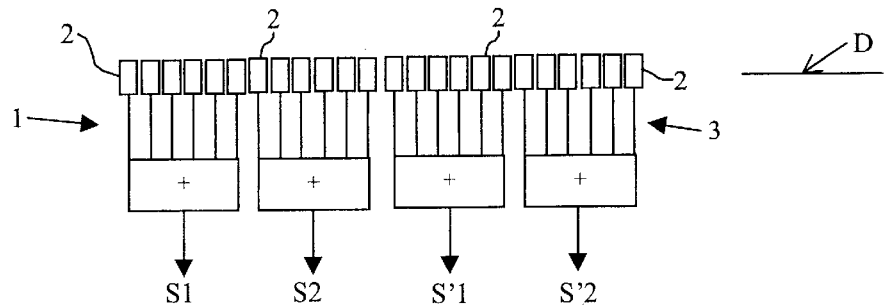

The detection device 1 comprises an even number 2N of sensitive elements 2 of magnetoresistor or Hall-effect probe type, placed an equal distance d apart, these elements 2 being disposed substantially along a straight line D, see FIG. 2B, for example the sensitive elements 2 can be disposed on an arc of a circle which can be approximated to a straight line.

In the embodiments represented, twenty-four sensitive elements 2 are provided.

This arrangement defines a strip 3 of sensitive elements 2 of length $(2N-1)d$.

The detection device also comprises an electronic circuit 4 making it possible to process the analog signals emanating from the various sensitive elements 2 so as to obtain information such as for example the speed, the angular position and/or the direction of displacement of a multipole magnetic member placed opposite the strip 3.

The detection device can be integrated on a silicon substrate or the like for example AsGa, so as to form an application specific customized integrated circuit, which is sometimes designated by the term ASIC so as to refer to the integrated circuit designed partially or entirely on the basis of requirements.

Figure 1A:
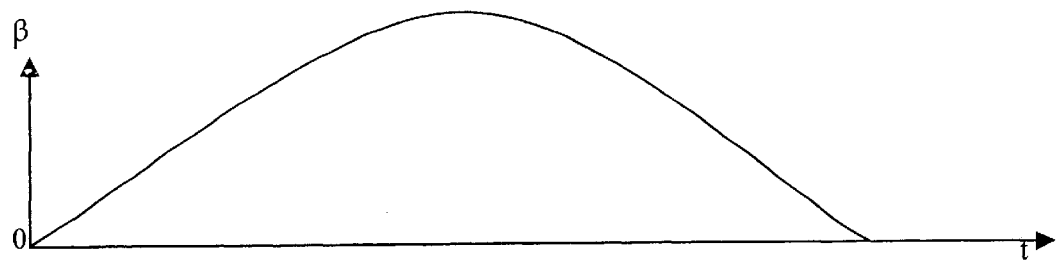
Figure 1B:
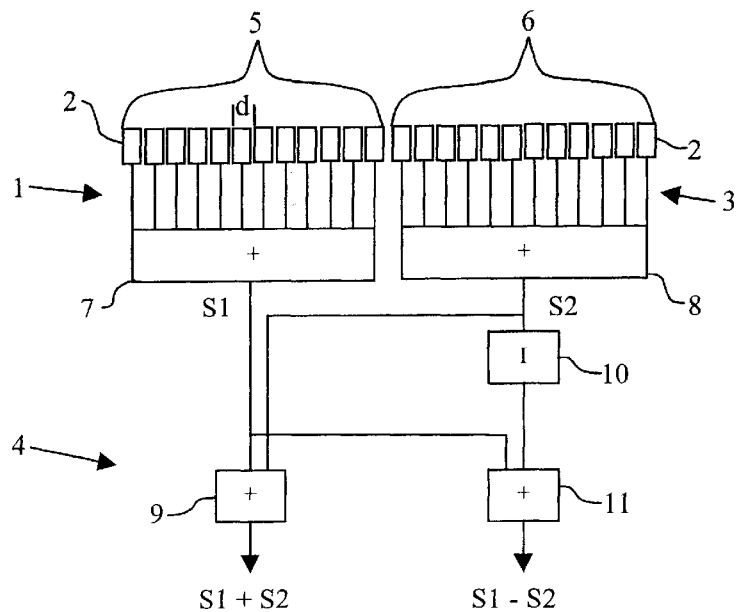
Figure 1C:
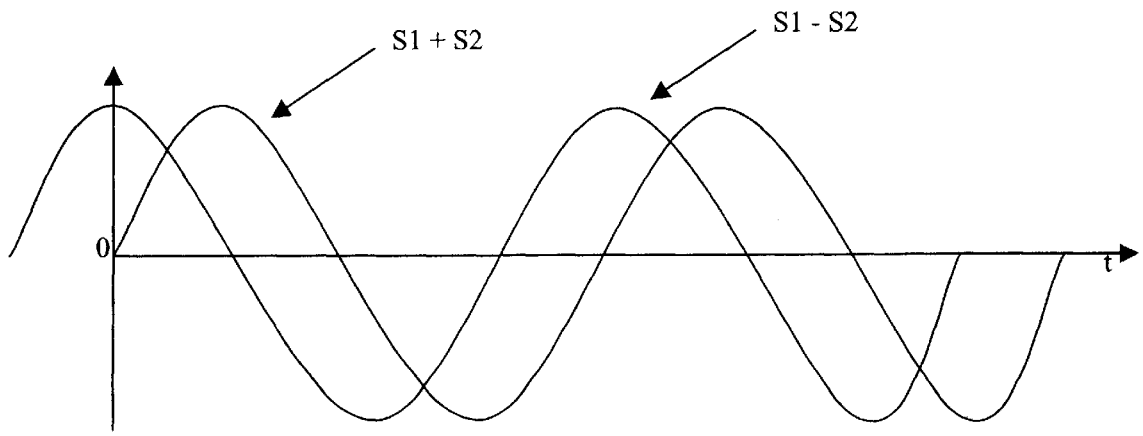

In the embodiment of FIG. 1, the assembly of sensitive elements 2 is divided into two subassemblies 5, 6 of N elements.

Each sensitive element 2 of the first subassembly 5 is connected to a first adder 7, such as an amplifier, ensuring the summation of the signals emanating from the first N sensitive elements 2.

Likewise, each sensitive element 2 of the second subassembly 6 is connected to a second adder 8 ensuring the summation of the signals emanating from the other N sensitive elements.

The two sums $S_1$ and $S_2$ emanating from the first and second adder means 7, 8 are connected to the input of a third adder means 9.

The output $S_1$ of the first adder means 7 and, via an inverter 10, the output $S_2$ of the second adder means 8 are connected to the input of a fourth adder means 11.

Two signals $S_1+S_2$ and $S_1-S_2$ then appear at the output of the third 9 and fourth adder means 11.

When the multipole magnetic member is an annular member formed by a plurality of contiguous domains with reversed direction of magnetization in the given domain with respect to the two domains which are contiguous with it, provided that the polar length Lp, that is to say the length of a magnetic pole, is equal to the reference length Lp0 defined by 2Nd, the detection device delivers two signals $S_1+S_2$ and $S_1-S_2$ of like amplitude. The quadrature of these two signals is always equal to 90° regardless of the polar length Lp seen by the sensor.

Thus the device makes it possible to circumvent the tolerances for the placement of the sensitive elements, such as for example when these sensitive elements 2 are placed on a substrate.

Moreover, when the polar length Lp of the multipole magnetic member is not suited to the sensor, only the amplitude of the signals $S_1+S_2$ and $S_1-S_2$ is modified, the phase of these signals being kept constant.

Hence, if the device is implemented with no electronic interpolation system, that is to say if the digital signals have an identical resolution to that of the magnetic encoder, the quadrature of the signals $S_1+S_2$ and $S_1-S_2$ is preserved, for a wide range of polar lengths Lp.

With a view to the use of an interpolator increasing the resolution of the output signals from the detection device, the analog signals must fulfill the following conditions so as to ensure interpolated digital signals of good quality:

be in perfect quadrature;

be of like amplitude;

be devoid of magnetic and electronic offset.

Figure 2C:
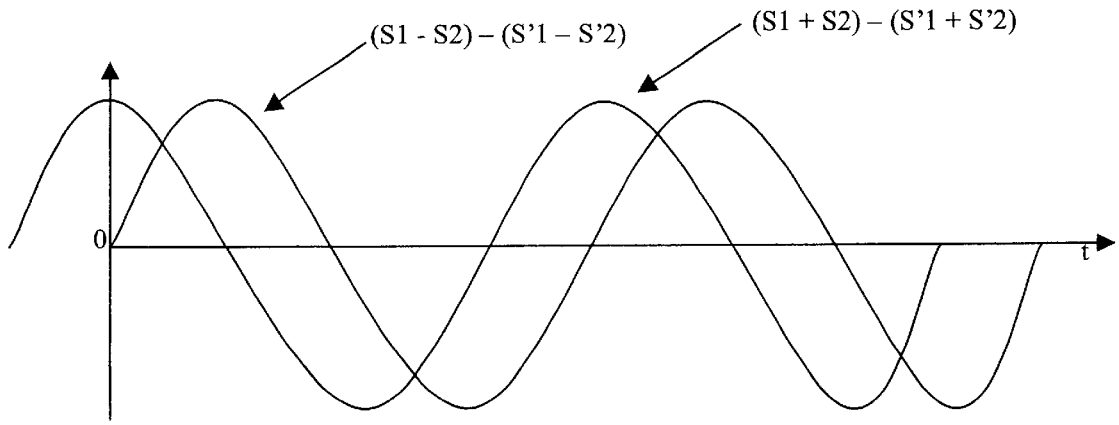

A second embodiment of the invention, represented in FIG. 2, proposes a detection device which delivers analog signals fulfilling these three conditions within a wide range of polar lengths Lp.

The detection device described above delivers signals in perfect quadrature.

When the reference length Lp0=2Nd is greater than the polar length Lp, the amplitude of the signal $S_1+S_2$ is less than that of the signal $S_1-S_2$.

When Lp0 is equal to Lp, the amplitudes of the signals $S_1+S_2$ and $S_1-S_2$ are equal.

When Lp0 is less than Lp, the amplitude of the signal $S_1+S_2$ is greater than that of the signal $S_1-S_2$.

In a first variant embodiment, and when Lp0 is greater than Lp, a means of increasing the number of polar lengths usable and of reducing the length of the strip 3 to 2M elements used out of the 2N (M being less than N, by programming, for example of EEPROM or ZENER ZAPPING type).

In a second variant embodiment, one of the two signals $S_1+S_2$ or $S_1-S_2$ can be electronically amplified with respect to the other so as to recover an identical amplitude for these two signals.

The magnetic and electric offset corresponds to a continuous component (the magnetic offset is for its part assumed to be uniform over the assembly of sensitive elements) which is added to the signals detected $S_1+S_2$ and $S_1-S_2$. However, in principle, the subtraction $S_1-S_2$ contains no continuous component related to the magnetic offset.

To circumvent the magnetic offset in the signal $S_1+S_2$, the strip 3 of sensitive elements can be split up into four quadrants with P sensitive elements and an electronic circuit based on an adder amplifier and on an inverter makes it possible to obtain the signals $S_1$, $S_2$, $S'_1$ and $S'_2$ emanating respectively from the first, second, third and fourth subassemblies with P sensitive elements of a strip with 4P sensitive elements.

The analog signals used in an interpolator can then be the following:

$(S_1-S_2)-(S'_1-S'_2)$
$(S_1+S_2)-(S'_1+S'_2)$

The canceling of the continuous component related to the magnetic offset, by virtue of this splitting into four quadrants, is compatible with the amplifying of the two signals obtained so as to increase the allowable polar length, when the polar length Lp is less than or greater than the reference length Lp0=2Pd. The electronic offset component can then be reduced moreover by other means which are not described in the present patent application.

The device according to the invention makes it possible to measure the magnetic field delivered by a moving multiple magnetic member and to deliver two analog signals which are always 90° out of phase electrically, and to do so independently of the polar length of the sensor.

The processing of these two analog signals by an ad-hoc circuit, not represented, makes it possible to deduce the direction of displacement of the multipole magnetic member, even for a low displacement speed.

What is claimed is:

1. A method of processing signals emanating from a sensor of position and/or of displacement of a moving member generating magnetic pulses, the sensor comprising a plurality of aligned magnetic pulse sensitive elements configured to emanate signals representative of sensed magnetic pulses, the method comprising the following steps:

creation of at least two subassembles of sensitive elements, each subassembly having N sensitive elements, wherein N is an integer;

summation of the signals emanating from each sensitive element of the first subassembly so as to form a sum $S_1$;

summation of the signals emanating from each sensitive element of the second subassembly so as to form a second sum $S_2$; and addition of the two sums $S_1$ and $S_2$; and addition of the signals $S_1$ and $-S_2$.

2. The method according to claim 1, wherein the even number of sensitive elements which is chosen for the creation of the subassemblies of sensitive elements is performed by programming of EEPROM, ZENER ZAPPING type, or the like.

3. The method according to claim 1, further comprising amplification of the signals $S_1+S_2$ and/or $S_1-S_2$ so as to obtain an identical amplitude for these two signals.

4. The method according to claim 1, wherein a number of sensitive elements which is a multiple of four is employed to form four subassemblies of P sensitive elements, wherein P is an integer, the method comprising the steps of:

summation of the signals emanating from each sensitive element of the first subassembly, so as to form a signal $S_1$;

summation of the signals emanating from each sensitive element of the second subassembly, so as to form a signal $S_2$;

summation of the signals emanating from the third subassembly, so as to form a signal $S'_1$;

summation of the signals emanating from each sensitive element of the fourth subassembly, so as to form a signal $S'_2$;

formulation of the signals $(S_1-S_2)-(S'_1-S'_2)$ and $(S_1+S_2)-(S'_1+S'_2)$ devoid of magnetic offset.

5. The method according to claim 1, further comprising a step of interpolation increasing the resolution of the signals emanating from the sensors.

6. A device for processing signals emanating from a sensor of position and/or of displacement of a moving member generating magnetic pulses, the sensor including a plurality of aligned magnetic pulse sensitive elements configured to emanate signals representative of sensed magnetic pulses, the device comprising means for performing the following steps:

creation of at least two subassemblies of sensitive elements, each subassembly having N sensitive elements, wherein N is an integer, summation of the signals emanating from each sensitive element of the first subassembly so as to form a first sum $S_1$, summation of the signals emanating from each sensitive element of the second subassembly so as to form a second sum $S_2$, addition of the two sums $S_1$ and $S_2$, and addition of the signals $S_1$ and $-S_2$; wherein the device comprises an ASIC type customized integrated circuit.

7. The device according to claim 6, wherein the sensitive elements of the sensor are incorporated within the ASIC customized integrated circuit.

8. The device according to claim 7, wherein the moving member is of annular shape and the detection of the direction of rotation of said annular member is provided by detecting a plurality of continuous domains having reversed direction of magnetization of a given domain with respect to the two domains which are contiguous with it.

* * * * *

UNITED STATES PATENT AND TRADEMARK OFFICE
CERTIFICATE OF CORRECTION

PATENT NO.    : 6,573,710 B1                                                            Page 1 of 1
DATED         : June 3, 2003
INVENTOR(S)   : A. John Santos et al.

It is certified that error appears in the above-identified patent and that said Letters Patent is hereby corrected as shown below:

<u>Column 5,</u>
Line 38, delete "multiple" and insert -- multipole --.

Signed and Sealed this

Second Day of September, 2003

JAMES E. ROGAN
*Director of the United States Patent and Trademark Office*